April 8, 1924.  A. KÖHLER  1,489,838
DEVICE FOR FINDING RANGES
Filed Aug. 13, 1921
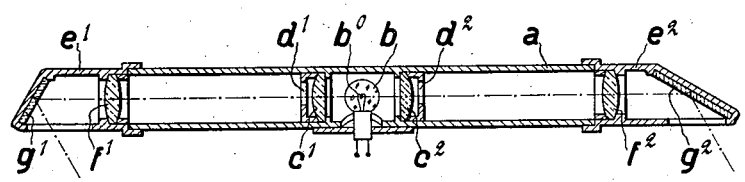
Inventor:
August Köhler.

Patented Apr. 8, 1924.

1,489,838

UNITED STATES PATENT OFFICE.

AUGUST KÖHLER, OF JENA, GERMANY, ASSIGNOR TO THE FIRM CARL ZEISS, OF JENA, GERMANY.

DEVICE FOR FINDING RANGES.

Application filed August 13, 1921. Serial No. 492,128.

(GRANTED UNDER THE PROVISIONS OF THE ACT OF MARCH 3, 1921, 41 STAT. L., 1313.)

*To all whom it may concern:*

Be it known that I, AUGUST KÖHLER, a citizen of the German Empire, residing at Jena, Germany, have invented a new and useful Device for Finding Ranges (for which I have filed an application in Germany May 25, 1918, Patent 307,725), of which the following is a specification.

The present invention relates to a device which is destined for finding ranges at night and which contains for this purpose two optical systems for producing two luminous fields on the object to be measured. The relative position of the two luminous fields and their size substantially only depend on the distance of the object to be measured, if the appertaining source of light be invariable with regard to size and position. However, on this invariability must not be counted, either that the source of light, as is the case with the arc lamp, is liable during the use to larger or smaller changes, or that new differences arise when exchanging an old glow lamp for a new one. The consequence thereof would be that the luminous fields will possibly not overlap each other at the proper place or not at all. Hence, it would not be possible to draw a definite conclusion from the relative position of the luminous fields upon the distance.

This drawback may, however, be obviated by substituting for the more or less variable source of light the aperture of a diaphragm of a certain definite shape and position. The images of these diaphragm apertures represent the two luminous fields. Any changes present in the position and size of the source of light will then affect at the most the luminosity but in no case the position and size of the two luminous fields. The device according to the present invention contains a single source of light and two optical systems having a broken axis. Hence, the novel device forms substantially a single, compact body which may be easily supported crosswise to a craft.

The annexed drawing represents a constructional example of the invention, showing the said device, destined for an aircraft.

A tube $a$ contains in its centre an incandescent lamp $b$. On either side of the latter there are disposed two collective lenses $c^1$ and $c^2$. Close behind the lens $c^1$ lies a diaphragm $d^1$, and close behind the lens $c^2$ a diaphragm $d^2$. At its ends the tube $a$ is shut off by means of the heads $e^1$ and $e^2$.

The head $e^1$ contains a collective lens $f^1$ and a plane reflector $g^1$, the head $e^2$ contains a collective lens $f^2$ and a plane reflector $g^2$. The filament $b^0$ of the incandescent lamp $b$ is imaged, on the one hand, by the lens $c^1$ at the position of the lens $f^1$ and, on the other hand, by the lens $c^2$ at the position of the lens $f^2$. The diaphragm $d^1$ is imaged on the ground by the lens $f^1$ and the reflector $g^1$ and likewise the diaphragm $d^2$ by the lens $f^2$ and the reflector $g^2$. The reflectors $g^1$ and $g^2$ are so disposed that the place of the ground, in which the two images of the diaphragm appear, lies outside the symmetrical plane of the air-craft, in case of the tube $a$ being perpendicular to the said plane; the respective place of the ground can, therefore, be observed in a particularly convenient way.

I claim:

In a device for finding ranges a source of light, two diaphragms lying at opposite sides of this source of light, two optical systems, each of which produces an image of one of the said diaphragms on the object to be measured and means for deflecting the two ray pencil systems emerging from the said two optical systems so as to be substantially parallel to each other.

AUGUST KÖHLER.

Witnesses:
 PAUL KRUGER,
 RICHARD HAHN.